(12) United States Patent
Jagan et al.

(10) Patent No.: US 10,479,608 B2
(45) Date of Patent: Nov. 19, 2019

(54) LINKED DISC ASSEMBLY

(71) Applicant: LUXME TECHNOLOGIES INC., Brossard (CA)

(72) Inventors: Navam Jagan, Brossard (CA); Keven Chan, Brossard (CA)

(73) Assignee: LUXME TECHNOLOGIES INC., Quebec (CA)

( * ) Notice: Subject to any disclaimer, the term of this patent is extended or adjusted under 35 U.S.C. 154(b) by 0 days.

(21) Appl. No.: 16/256,245

(22) Filed: Jan. 24, 2019

(65) Prior Publication Data

US 2019/0256293 A1 Aug. 22, 2019

Related U.S. Application Data

(60) Provisional application No. 62/631,989, filed on Feb. 19, 2018.

(51) Int. Cl.
*B65G 17/06* (2006.01)
*B65G 17/38* (2006.01)
*B65G 19/20* (2006.01)

(52) U.S. Cl.
CPC ............. *B65G 17/06* (2013.01); *B65G 17/38* (2013.01); *B65G 19/20* (2013.01)

(58) Field of Classification Search
CPC ......... B65G 17/06; B65G 17/38; B65G 19/20
USPC ................... 198/731, 850, 851; 59/85, 89
See application file for complete search history.

(56) References Cited

U.S. PATENT DOCUMENTS

| 785,881 | A | * | 3/1905 | Hill |
|---|---|---|---|---|
| 2,785,578 | A | * | 3/1957 | Nold ..................... F16G 13/02 474/235 |
| 3,768,631 | A | | 10/1973 | Ragnvald |
| 3,795,951 | A | * | 3/1974 | Ratcliff ..................... B66C 1/34 294/82.1 |
| 3,986,602 | A | | 10/1976 | Dretzke |
| 4,113,084 | A | * | 9/1978 | Temme .................. B65G 19/24 198/728 |
| 4,161,100 | A | * | 7/1979 | Dalferth .................. F16G 15/02 59/93 |
| 4,182,116 | A | * | 1/1980 | Clement ................. F16G 15/02 59/93 |

(Continued)

FOREIGN PATENT DOCUMENTS

| DE | 2651523 A1 | 5/1978 |
|---|---|---|
| FR | 2523639 A1 | 9/1983 |

(Continued)

*Primary Examiner* — Douglas A Hess
(74) *Attorney, Agent, or Firm* — Jacob M. Ward; Ward Law Office LLC

(57) ABSTRACT

A linked disc assembly for use in continuous chain tensioning assemblies in tubular chain drag conveyors, comprising link members and alternating double ear disc members. Each disc member comprises a disc plate and an ear member transversely projecting therefrom. Each ear member consists of an arcuate leg defining a channel extending parallel to the disc plate and hingedly engaged by a link member. Each open chain link member defines a spacing gap. Each ear member arcuate leg defines a transverse notch adjacent a corresponding disc plate, the notch sized and shaped complementarily to the link member gap so as to form a sliding ramp for manual guided quick release through passage of a link member.

11 Claims, 21 Drawing Sheets

(56) References Cited

U.S. PATENT DOCUMENTS

| | | | | |
|---|---|---|---|---|
| 4,501,447 A | * | 2/1985 | Tatton | B65G 17/38 |
| | | | | 299/43 |
| 4,597,492 A | | 7/1986 | Lachonius et al. | |
| 4,706,451 A | * | 11/1987 | Stromberg | F16G 15/02 |
| | | | | 59/78 |
| 5,305,872 A | * | 4/1994 | Hutton | B65G 19/24 |
| | | | | 198/851 |
| 5,343,912 A | * | 9/1994 | Chronister | B27L 1/122 |
| | | | | 144/208.7 |
| 5,402,877 A | * | 4/1995 | Thiele | B65G 19/10 |
| | | | | 198/731 |
| 5,402,880 A | | 4/1995 | Murphy | |
| 5,469,697 A | * | 11/1995 | Kuroki | B21L 3/04 |
| | | | | 59/31 |
| 6,062,374 A | * | 5/2000 | Meya | B65G 19/10 |
| | | | | 198/731 |
| 6,073,752 A | * | 6/2000 | Meya | B65G 19/22 |
| | | | | 198/731 |
| 6,145,293 A | * | 11/2000 | Jenkins, Jr. | F16G 15/06 |
| | | | | 59/85 |
| 6,615,974 B2 | * | 9/2003 | Scholz | B65G 17/42 |
| | | | | 198/706 |
| 6,959,769 B2 | * | 11/2005 | Merten | E21C 29/04 |
| | | | | 172/612 |
| 7,467,510 B2 | * | 12/2008 | Tout | B65G 19/24 |
| | | | | 59/85 |
| 7,896,766 B2 | | 3/2011 | Mitzschke et al. | |
| 7,997,402 B2 | * | 8/2011 | Merten | B65G 19/20 |
| | | | | 198/728 |
| 8,631,930 B2 | * | 1/2014 | Meya | B65G 19/24 |
| | | | | 198/850 |
| 8,756,907 B2 | * | 6/2014 | Briscoe | F16G 13/14 |
| | | | | 59/78 |
| 9,051,993 B2 | * | 6/2015 | Benecke | B65G 19/20 |
| 2003/0010602 A1 | | 1/2003 | Jagan | |
| 2014/0346016 A1 | | 11/2014 | Henrekson | |
| 2015/0008101 A1 | | 1/2015 | Miglavs | |

FOREIGN PATENT DOCUMENTS

| | | |
|---|---|---|
| FR | 2629804 A1 | 10/1989 |
| JE | 202006007874 U1 | 8/2006 |
| SE | 511811 C2 | 11/1999 |

\* cited by examiner

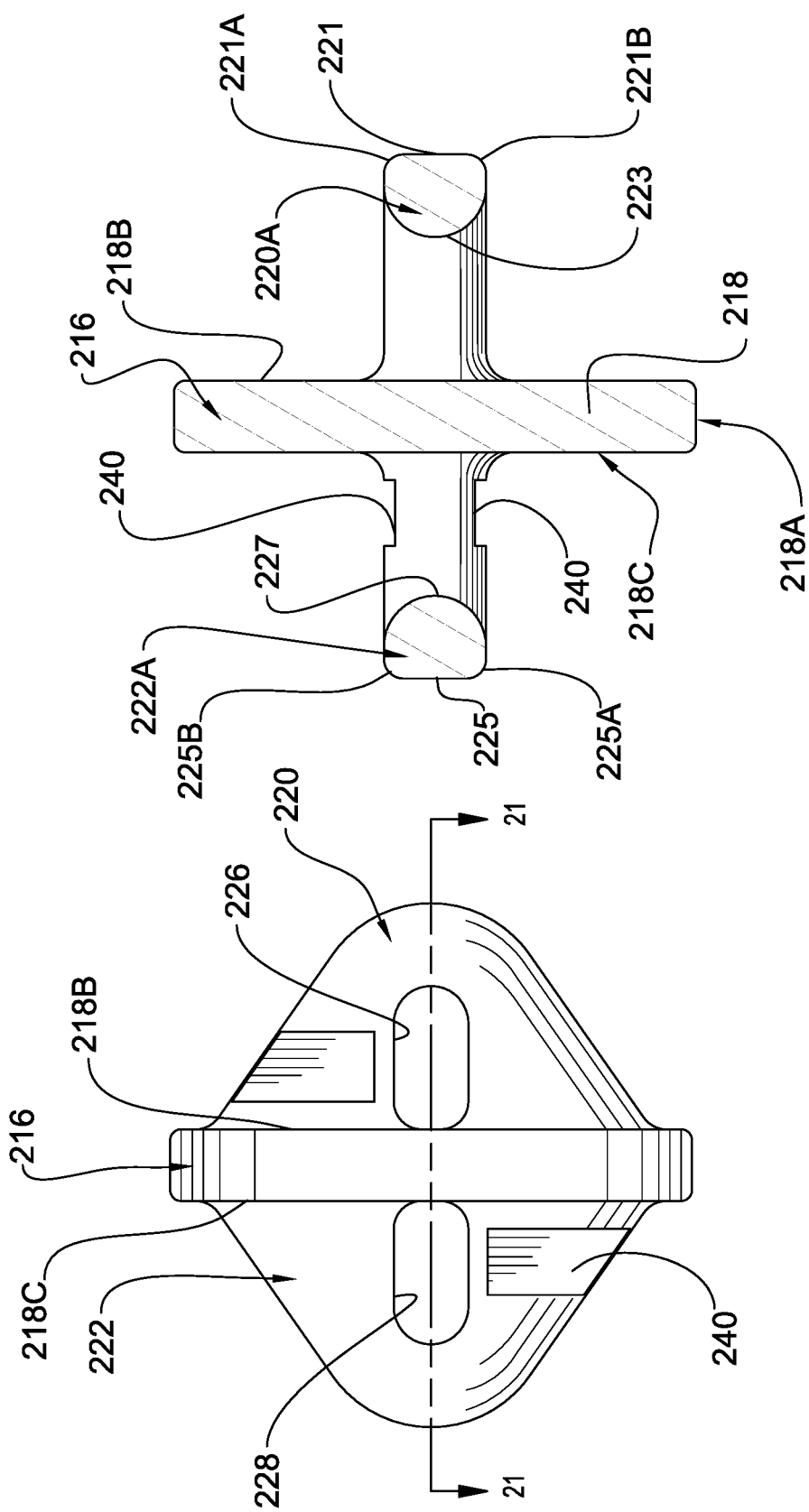

LINKED DISC ASSEMBLY

CROSS-REFERENCE DATA

This patent application claims convention priority based upon currently co-pending U.S. provisional patent application No 62/631,989 filed Feb. 19, 2018.

FIELD OF THE INVENTION

The present invention relates to continuous chain tensioning assemblies in tubular chain drag conveyors with no metal to metal contact points in the conveying area with wet Clean In Place features, in particular for food or oil sand conveying applications. The continuous chain tensioning assembly may include a plastic or metallic sprocket or rim with spring spindle tensioner, to be threaded around the sprockets of drive assembly and tensioning assembly, which constitutes the tubular chain conveyor. Multiple disc plates or "pucks" are connected in successively alternating fashion to chain links, in order to form open buckets or pockets over the conveyor belt to convey bulk materials therein in a United States Department of Agriculture (USDA) safety standards regulations compliant tubular chain conveyor.

BACKGROUND OF THE INVENTION

Many ready-to-eat foods are processed with mechanical means that consist of design aspects and materials that most often satisfy basic food grade safety standards and regulations set by the United States Food and Drug Administration (FDA) and the USDA. However, recent studies have demonstrated human health safety hazards borne from contamination generated by clusters of foodborne infections, particularly during hot summer periods. Such infections generate population illnesses that usually arise from microbial agents such as pathogenic bacteria, viruses or parasites.

According to the World Health Organization (WHO), each year about 10% of the world population become ill after having consumed contaminated food, and almost half a million persons will die as a result. The clusters of microbial outbreaks could be the result of improper farming practices or improper packaging routines, or even from deficiencies in the handling of food importation procedures.

Prior art food grade chain and disk assemblies consist of mechanical fasteners and geometric features that are often non-USDA compliant.

SUMMARY OF THE INVENTION

The present invention is therefore directed at a holistic approach to address and curb food borne contaminations, by improving upon food conveying philosophy, enabling technology and regulations compliance to ensure highest levels of sanitation and of pathogen control.

To address the deficiencies outlined above relating to foodborne illnesses from improper food safety handling, the present applicant has designed and engineered a tubular drag chain conveyor that satisfies USDA dairy as well as meat and poultry standards and specification. The USDA requires the usage of engineering materials as well as design practices that reduce contamination hazards, while facilitating the system's washability for quick reuse.

Amongst suitable rigid materials that are USDA compliant, there are for example stainless steel and polymers, for example:

316 L stainless steel; and

Ultra-high molecular weight polyethylene (UHMW-PE). Using these rigid materials to load bearing components introduces challenges with stiffness and strength, since the chain and link assembly is one of the main load-induced fatigued components in the present invention tubular chain conveyor. The pitch of the chain and disk assembly must nevertheless be maintained, as it must correspond to the pitch of the driving sprocket.

Therefore, with these design constraints, a specific geometry of the conveying disc as well as of the chain link to retain stiffness under a specific continuous load needed to be incorporated into the present application design.

The invention therefore relates to a linked disc assembly for use in continuous chain tensioning assemblies in tubular chain drag conveyors with no metal to metal contact points in the conveying area with wet Clean In Place features, said linked disc assembly comprising a series of first link members connected to each other coextensively and indirectly via a series of alternating double ear first disc members, so that an elongated linked disc assembly be formed;

each disc member comprises a disc plate defining a peripheral edge and two opposite main walls merging with said peripheral edge, an ear member transversely projecting from each of the two said main walls respectively; each ear member consisting of an arcuate leg circumscribing an open through channel extending parallel to said disc plate, each said through channel from a given disc member is loosely engaged by a corresponding link member, whereby a hinge mount is formed there-between; wherein each link member is of the open chain link type defining a single unitary body having two opposite arcuate portions joined at one end thereof and spaced at their opposite spaced end portions thereof by a spacing gap for access to an enclosure circumscribed said link member body; and further including a ramp means providing manual guided quick release through passage of a link member transversely through said ear member arcuate leg while largely avoiding accidental release thereof.

In one embodiment, said ramp means consists of a transverse notch made onto said ear member arcuate leg adjacent a corresponding said disc plate, said notch sized and shaped complementarily to said link member gap wherein a selected one of said link member spaced opposite end portions are slidingly engageable through said notch during egress/ingress thereof.

Each said ear member arcuate leg defining a transverse notch adjacent a corresponding said disc plate, said notch sized and shaped complementarily to said link member gap so as to form a sliding ramp for manual guided quick release through passage of a link member transversely through said ear member arcuate leg while largely avoiding accidental release thereof.

Said ear member arcuate leg may include a radially outward web portion farthest away from said disc plate, said web portion defining a semi-circular cross-section. Said ear member web portion could then include a radially outermost flat tangential first edge portion and a radially inward arcuate second edge portion whereby said web portion is sized to conformingly fit inside said link member enclosure.

In one embodiment, said first and second edge portions merge at corner edge portions, said corner edge portions being rounded to facilitate through passage of said ear members across said link member spacing gap.

The shape of said disc plate could be selected from the group comprising ovoidal, arcuate, circular and quadrangular shapes.

The material for said disc plate could be selected from the group comprising UHMW-PE, cast nylon, extruded nylon, and copolymer acetal.

There could be further added second disc members, said second disc members similar to the first mentioned ones but lacking said notches; and further including second link members, each second link member consisting of one and another separate arcuate elements, each said one arcuate element defining first tenon and mortise means at opposite ends thereof and each said another arcuate element defining second tenon and mortise means at opposite ends thereof wherein a tenon and mortise joint means is formed by interlocking engagement of said first and second tenon and mortise means, and wherein said arcuate elements tenon and mortise means further including a radially outward chamfer zone for accommodating a welding material.

Said chamfer zone could be cross-sectionally V-shape.

There could be further included welding material inserted into said chamfer zone, said welding material selected from the group comprising TIG, MIG and ERW. The welding material particle coarseness from link member grinding and polishing could range between 53 to 140 micrometers.

BRIEF DESCRIPTION OF THE DRAWINGS

FIG. 10 is a disassembled plan view of one embodiment of the chain link member from FIG. 9, but at a smaller scale and showing two separate complementary U-shape half link parts of the link member;

FIG. 11 is a plan view of the first embodiment of link member and cross-sectional view of a pair of opposite disc members connected thereto, suggesting how the disassembled link member from FIG. 10 is first freely engaged with a corresponding disc closed loop ear member, and then the two half parts of the link member are locked at their tenon and mortise joint means ends are locked in and welded in place using e.g. TIG, MIG or resistance welding at temperatures ranging e.g. between 500 to 1500 degrees Fahrenheit (about 260 to 816 degrees Celsius);

FIGS. 12 and 13 are similar to FIG. 11 but at a smaller scale and suggesting cooling of the combined link members with e.g. a selected one method from cold air injection, nitrogen, water or compressed air, and grinding and polishing of links welding areas are performed e.g. up to 90 to 240 grits level (about 53 to 140 micrometers of particles coarseness);

FIG. 14 shows a plan view of the first embodiment linked disc assembly, with three link members and three corresponding disc members, suggesting that the same procedure as in FIGS. 10 to 13 is performed to other U-shape links and associated double ears disc to provide a continuous linked disc assembly;

FIG. 20 is a plan view of the second embodiment of disk from FIG. 19, showing reduced depth of the disc ear through channels relative to that of the first embodiment of FIG. 6 or 7;

FIG. 21 is a cross-sectional view of the disk taken along line 21-21 of FIG. 20, and further showing the radially outward tangential straight edge of the outwardmost arcuate portion of disc ear for optima load bearing purposes;

DETAILED DESCRIPTION OF THE EMBODIMENTS OF THE INVENTION

Figure 1:
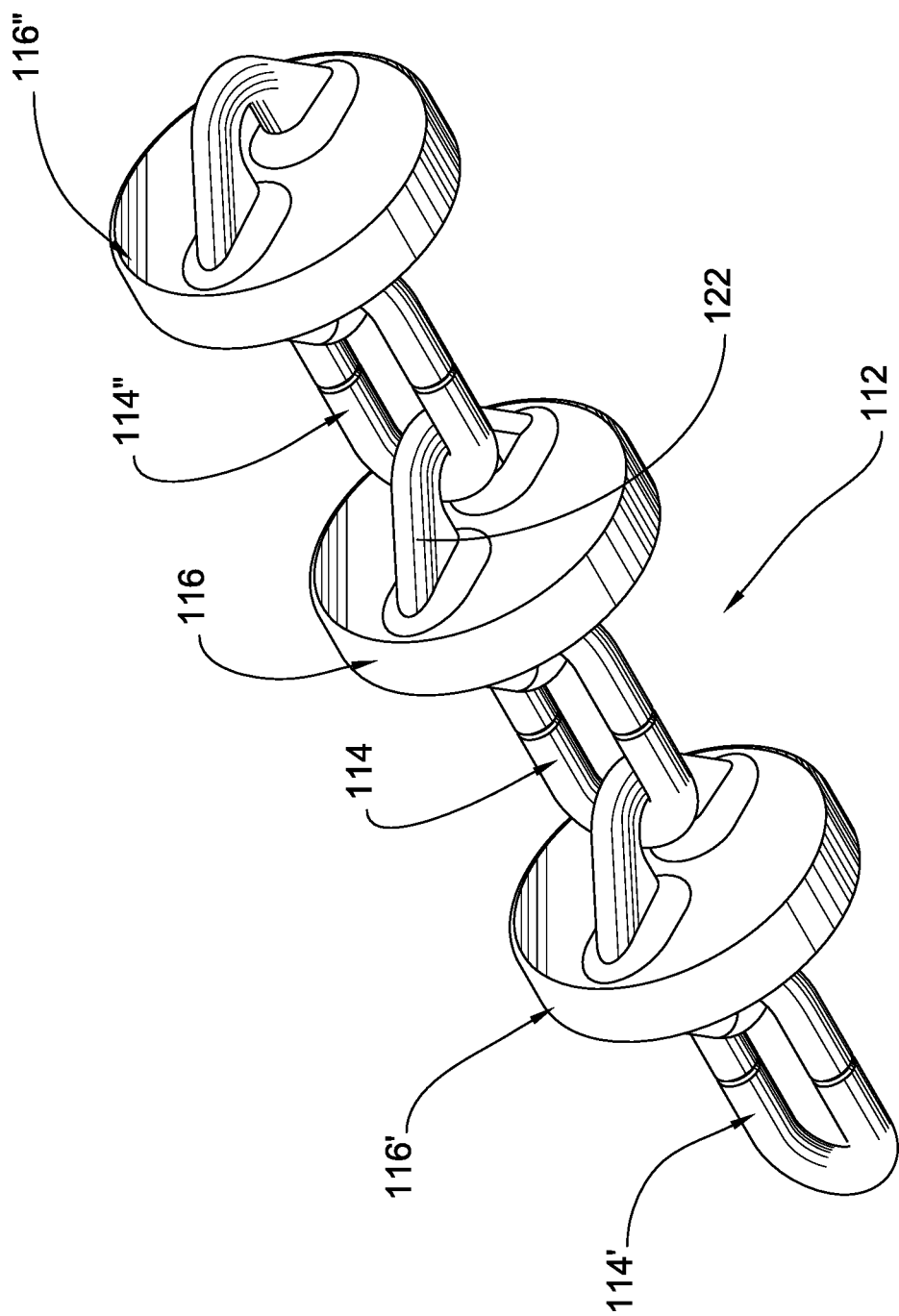
FIG. 1 is a perspective view of a first embodiment of open chain linked disc assembly, comprising three metallic links each alternating with corresponding double ear discs.
Figure 2:
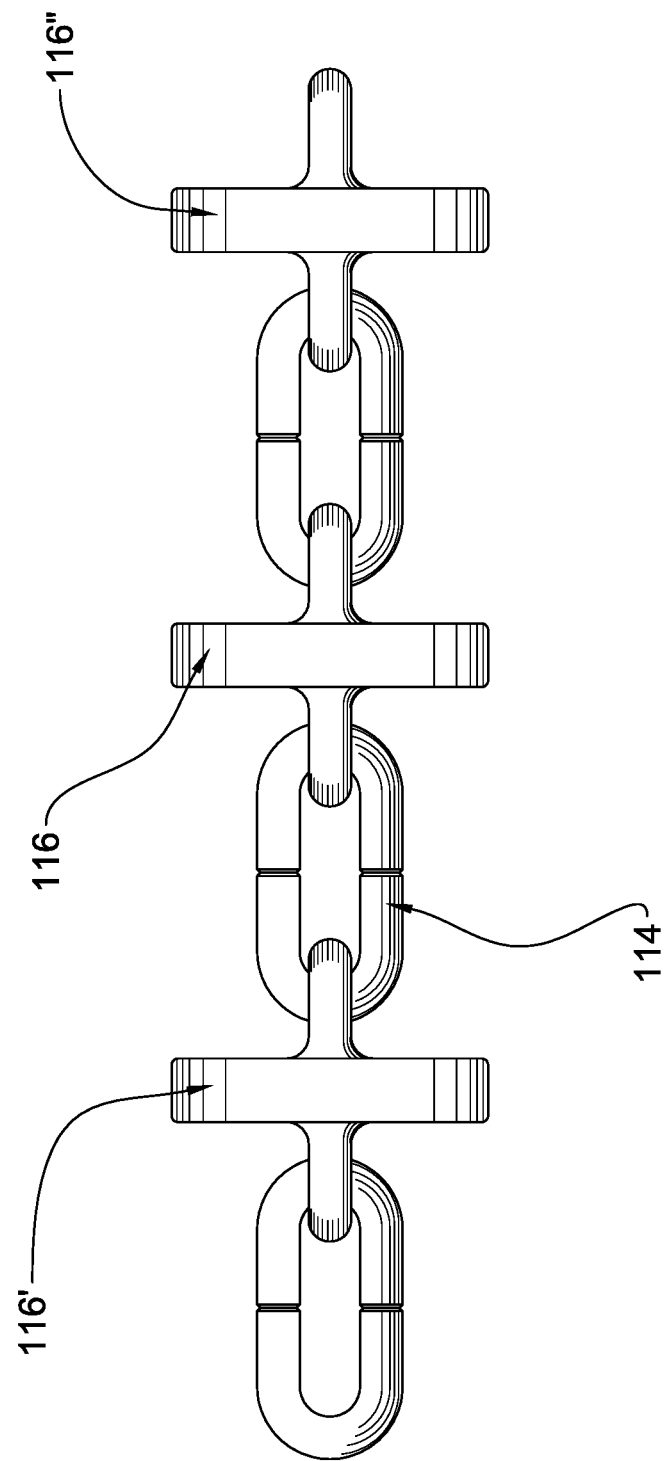
FIG. 2 is a plan view of the linked disc assembly of FIG. 1.
Figure 3:
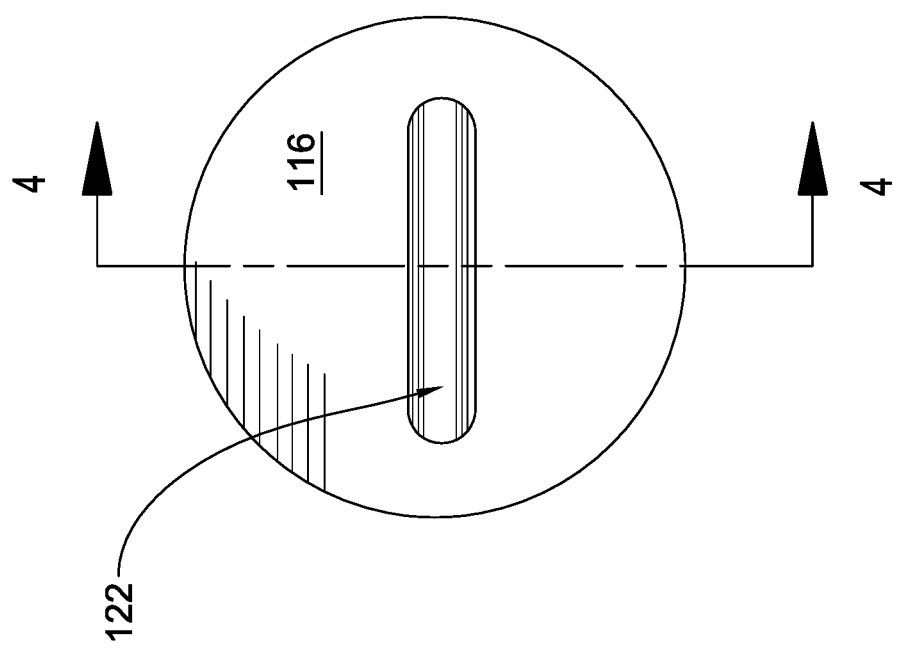
FIG. 3 is an end view of the assembly of FIG. 1.

In the first embodiment of the invention illustrated in FIGS. 1 to 14 of the drawings, the linked disc assembly 112 comprises a series of rigid (e.g. metallic) link members 114, 114', 114", etc . . . connected to each other coextensively and indirectly via a series of successively alternating corresponding double ear disc members 116, 116', 116", etc . . . so that an elongated linked disc assembly 112 be formed. Each link member 114 forms a continuous closed loop, rubbing one another in successive pairs while turning and during usage. Linked chain assembly 112 moves over an endless belt (not shown) inside a conveyor tube (also not shown), wherein a series of open buckets P (FIG. 18) are formed between each pair of successive discs 116, 116', said buckets for receiving and for conveying there-along granular food bulk material.

Figure 9:
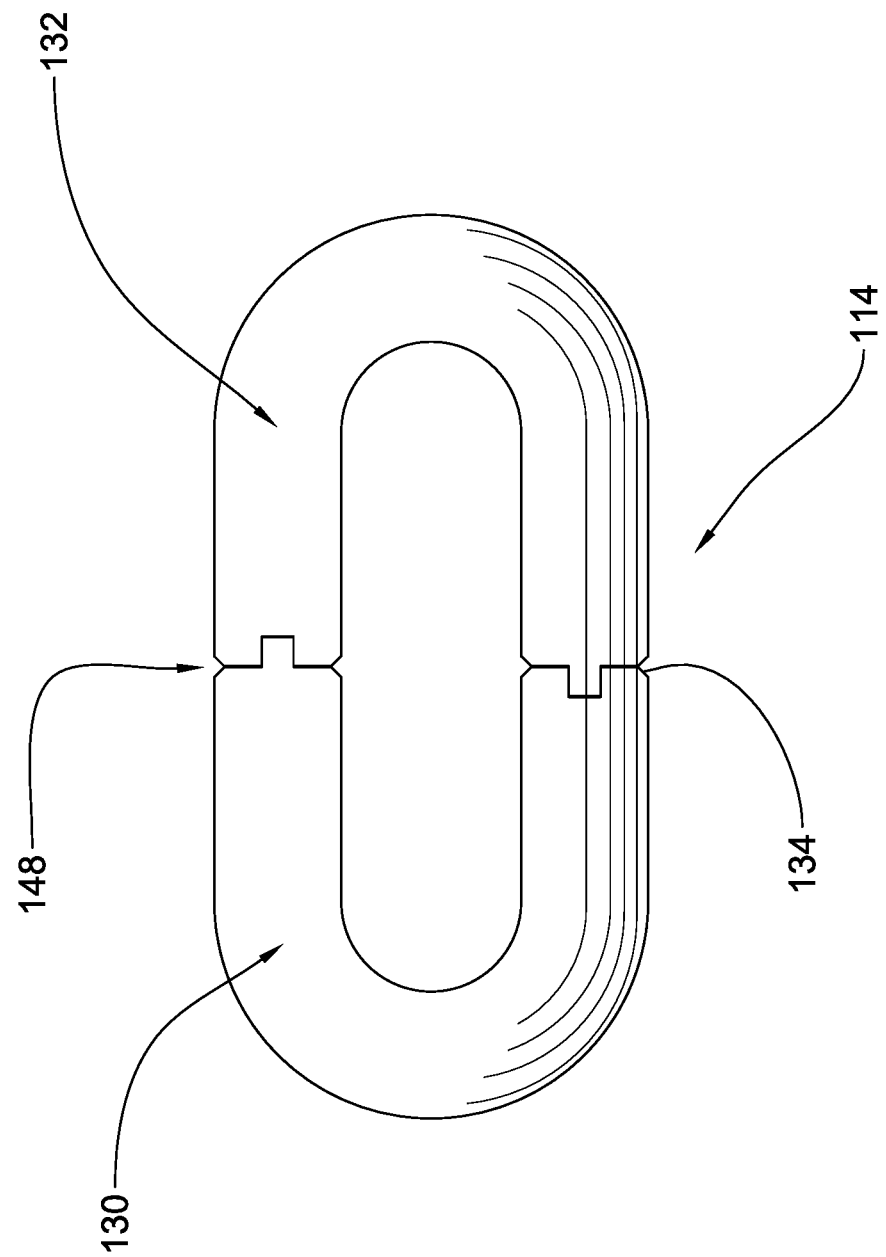
FIG. 9 is an enlarged plan view of a first embodiment of chain link member from FIG. 1 taken separately.
Figure 11:
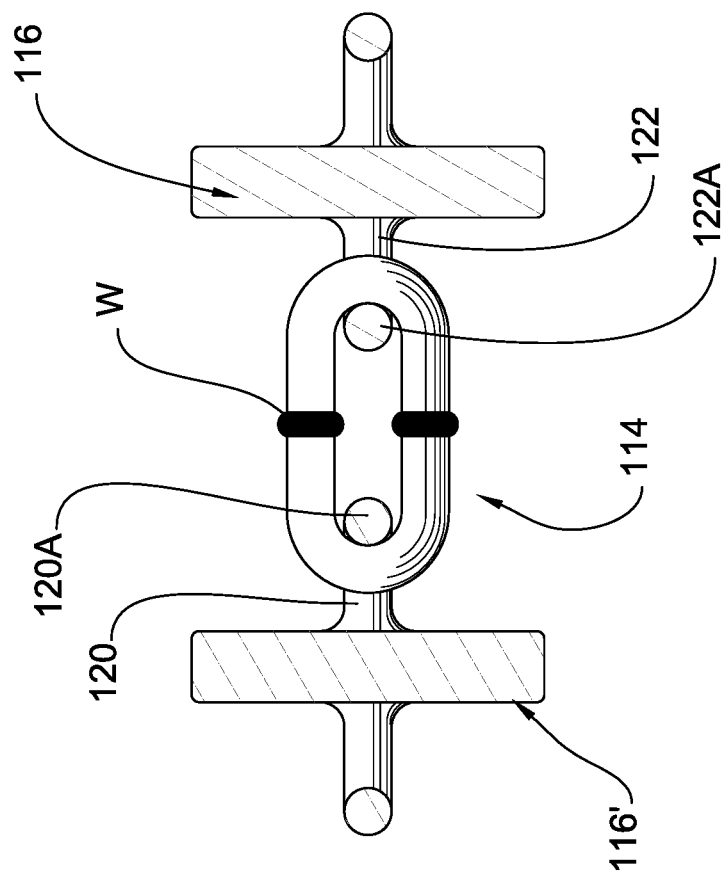
FIGS. 10 to 14 sequentially show the five steps for assembly of the linked disc assembly of FIG. 1, namely.
Figure 10:
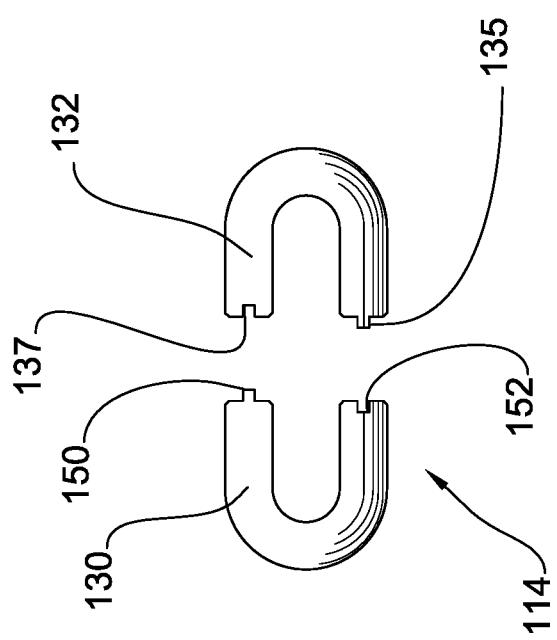
Figure 13:
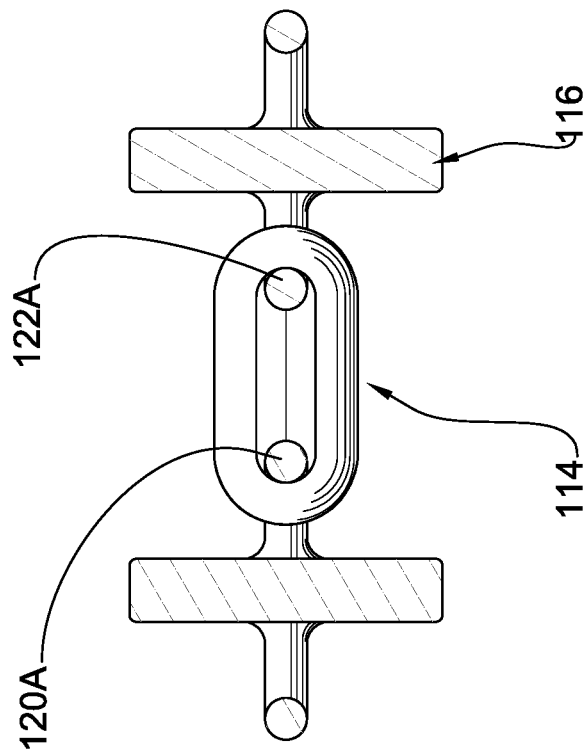
Figure 12:
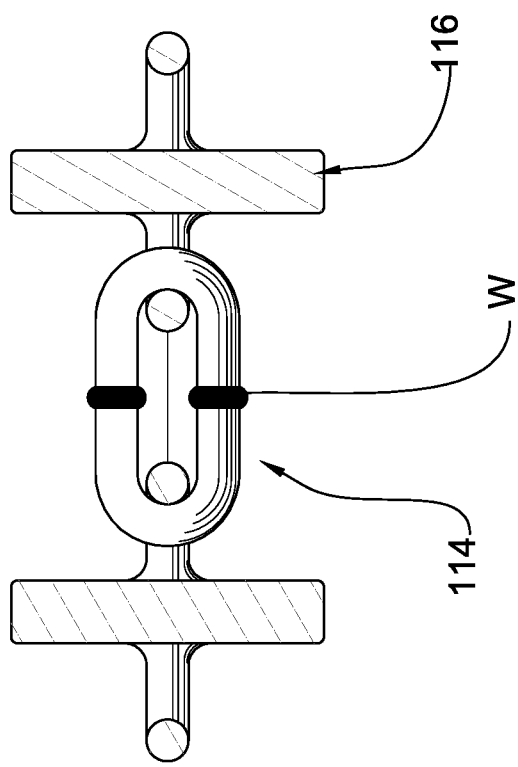
Figure 14:
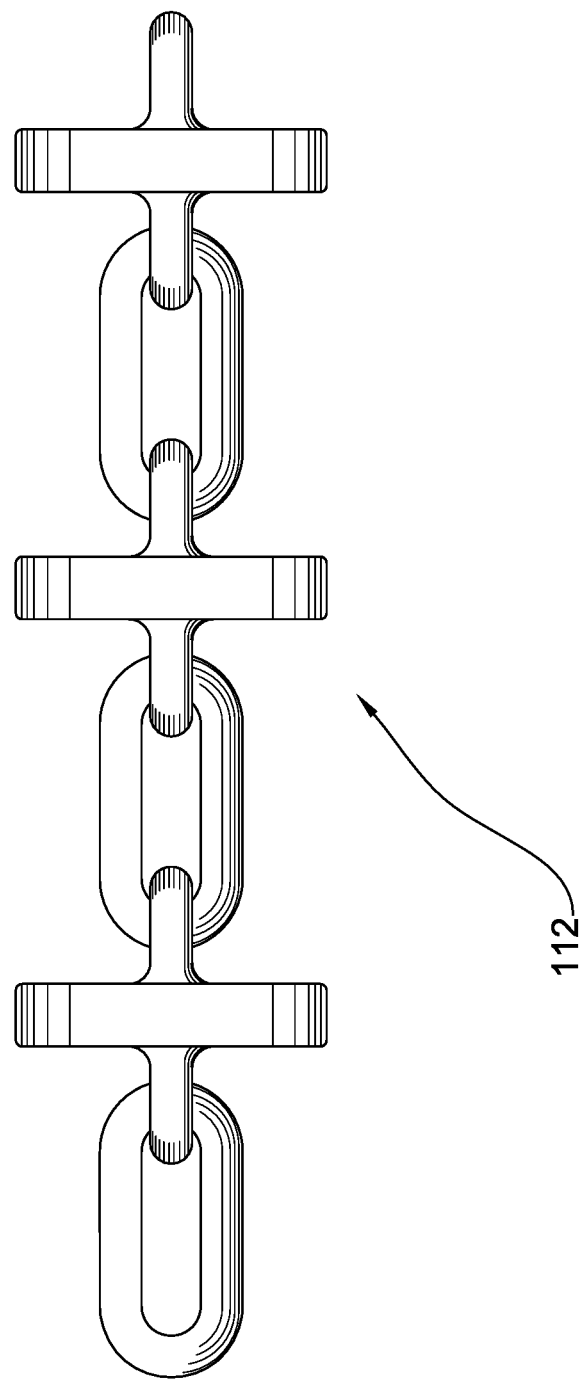
Figure 15:
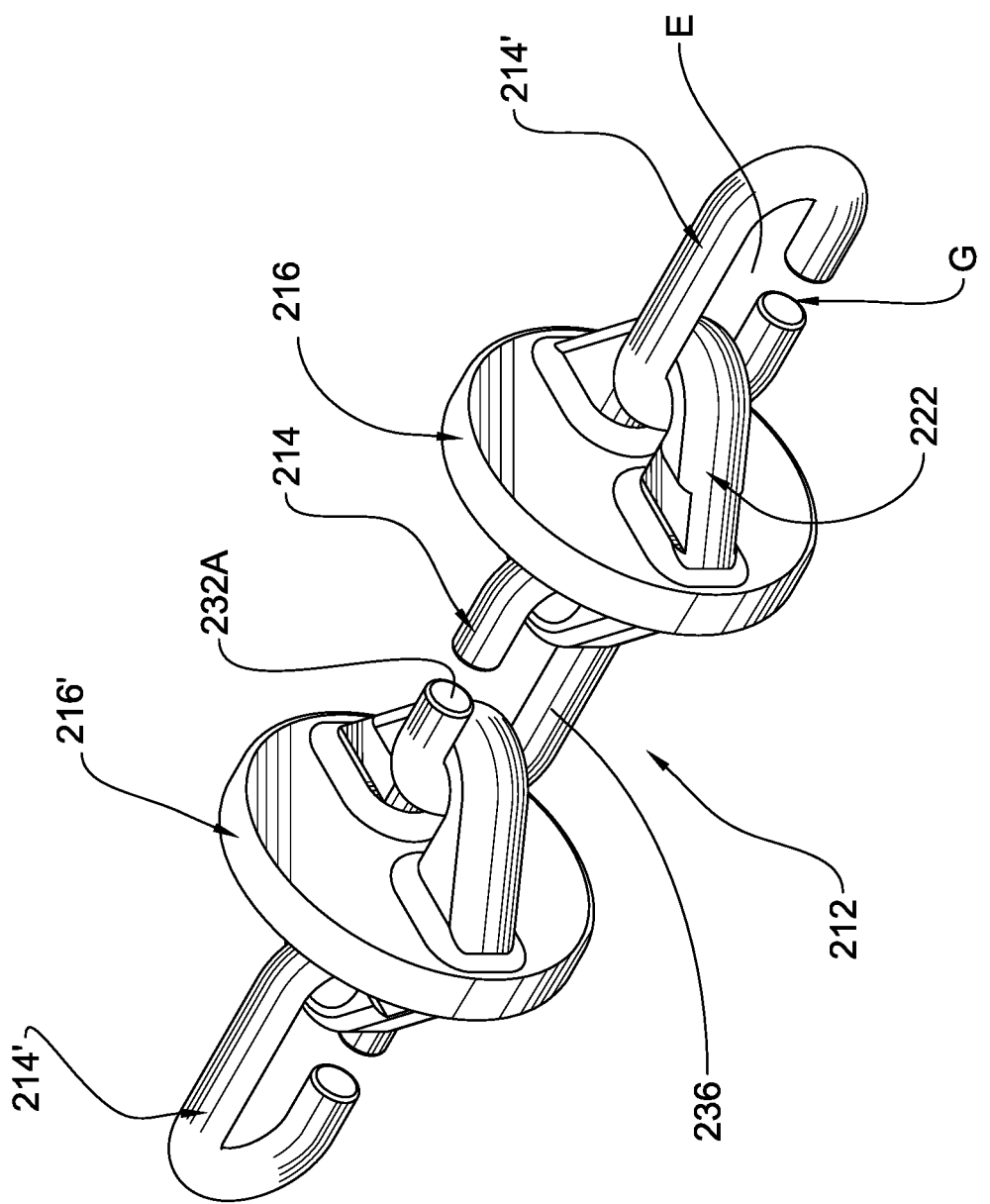
FIG. 15 is a perspective view of a second embodiment of chain linked disc assembly, comprising three link members of the open link type each alternating with two corresponding double ear discs.
Figure 16:
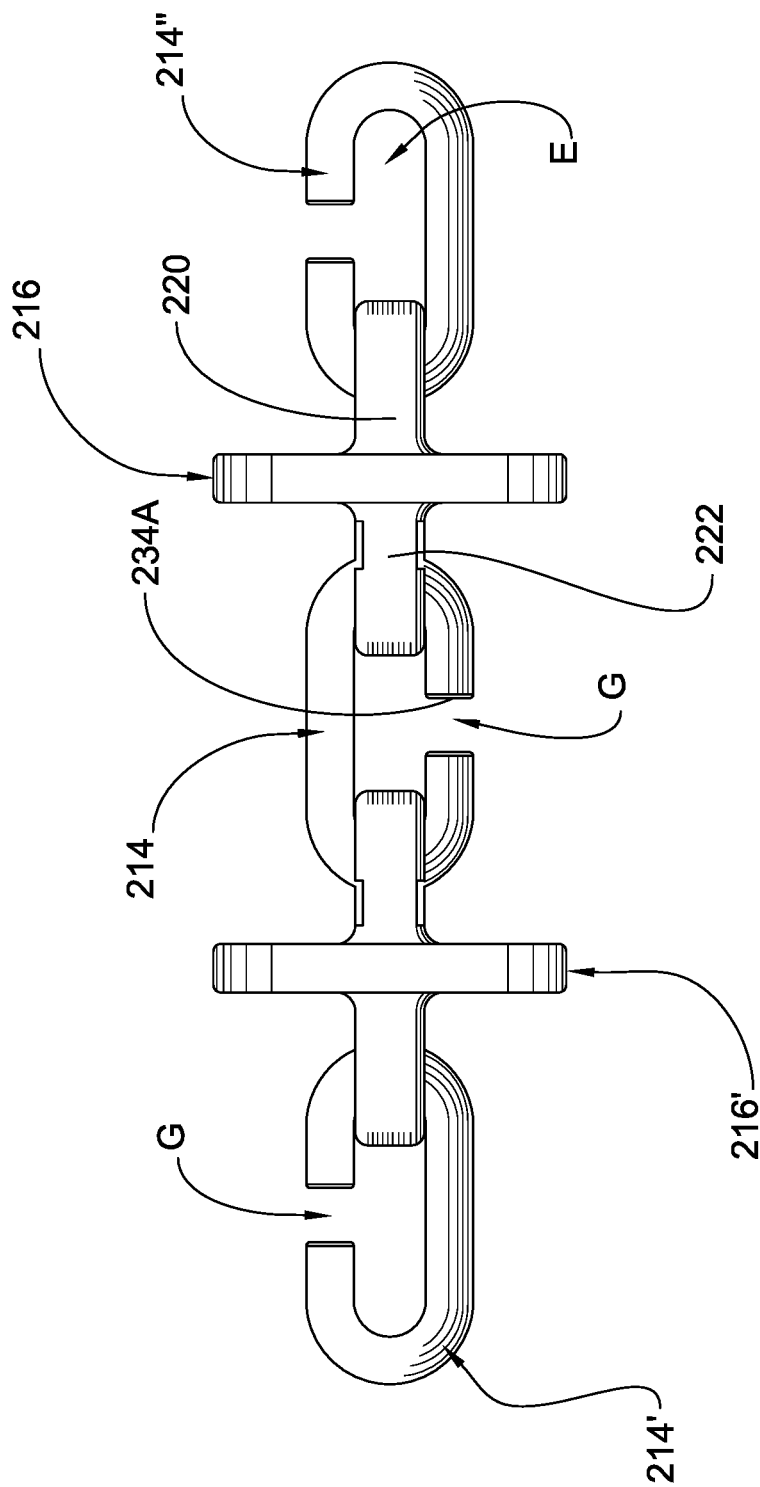
FIG. 16 is a plan view of linked disc assembly from FIG. 15 according to the second embodiment of the invention.
Figure 17:
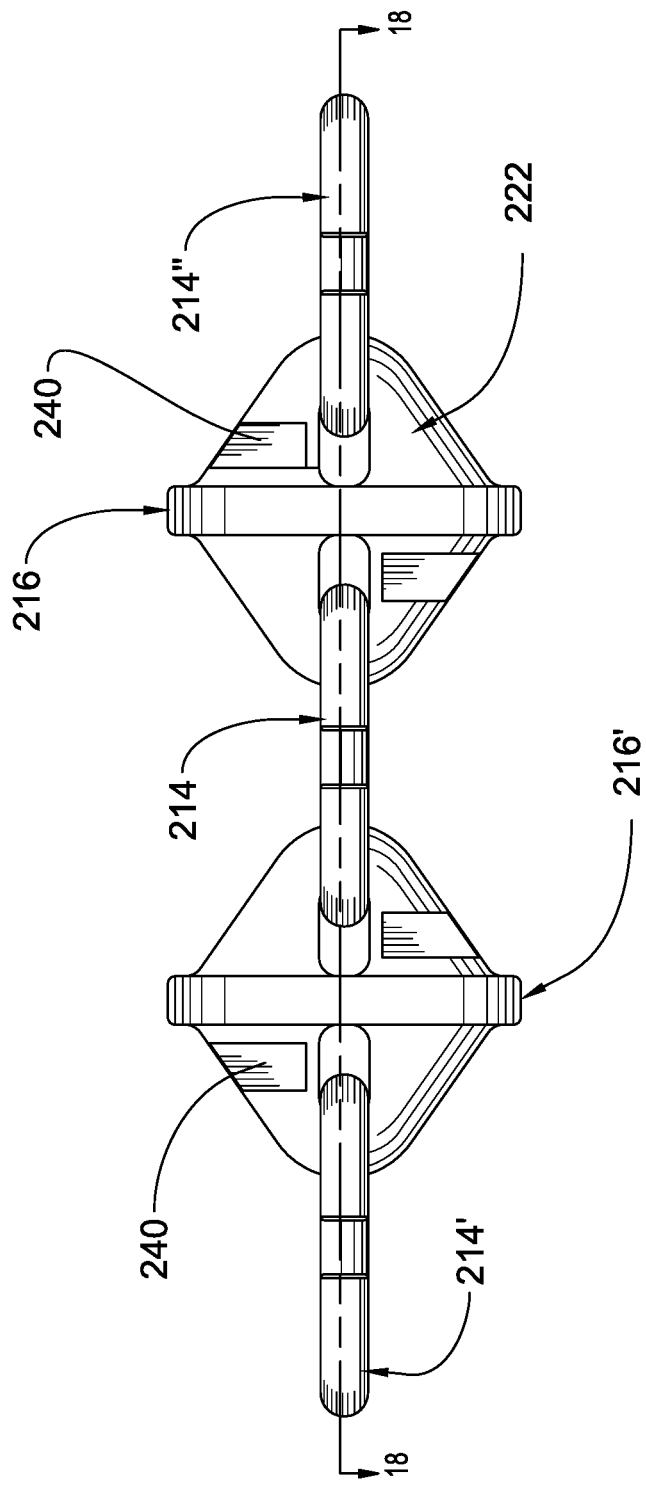
FIG. 17 is a view similar to FIG. 16 but with the linked disk assembly axially rotated by a quarter of a turn.

As best shown in FIGS. 9 and 10 of the drawings, each link member 114 is formed of two separate facing U-shape metallic bars, 130, 132. In one embodiment, bar 130 includes first tenon and mortise means, e.g. four bolts or pins 135 and corresponding cavities 137, while bar 132 includes second tenon and mortise means e.g. pin 150 and cavity 152, wherein a complementary tenon and mortise joint means 148 is formed.

In another embodiment, joint means 148 is further welded in place with welding material W at radially outward chamfer zones 134 so that a closed elongated ovoidal loop be formed, as illustrated. In one embodiment, chamfer zone 134 is cross-sectionally V-shape, as it has been found that such shape provides optimal welding interconnection performance.

In one embodiment bars 130, 132 are joined together solely with welding material W, without any tenon and mortise joint means.

The two separate U-shape link half parts 130, 132 links from FIG. 10 are locked in and welded in place using methods such as TIG, MIG, and ERW at temperatures e.g. ranging between 500 and 1,500 degrees Fahrenheit (about 260 to 816 degrees Celsius).

TIG stands for—Tungsten Inert Gas Welding, an arc welding process for welding sections of stainless steel and non-ferrous metals, that uses a non-consumable tungsten electrode to produce the weld. The weld area is protected from atmospheric contamination by an inert shielding gas (argon or helium), and a filler metal is normally used. A constant current welding power supply produces electrical energy, which is conducted across the arc through a column of highly ionized gas and metal vapors known as plasma. Tungsten is preferred because the arc is formed between a non-melting tungsten electrode (including alloys) and the base material. Inert Gas, because rare gas is used.

MIG stands for—Metal Inert Gas Welding: a welding process in which an electric arc forms between the consumable wire electrode and the workpiece metals, which heats the workpiece metals, causing them to melt and join. Along with the wire electrode, a shielding gas feeds through the welding gun, which shields the process from contaminants in the air.

ERW stands for—Electric Resistance Welding: a group of welding processes such as spot and seam welding that produce coalescence of fraying surfaces where heat to form the weld is generated by the electrical resistance of material combined with the time and the force used to hold the materials together during welding.

As best shown in FIGS. 5 to 8, each disc member 116 comprises a disc plate 118 defining a tangentially flat peripheral edge 118A and two opposite main walls 118B and 118C merging with peripheral edge 118A. Opposite ear members 120, 122, transversely projects from opposite main walls 118B and 118C respectively, and form a corresponding transverse through channel 166, 168.

In one embodiment, each ear member 120, 122, defines a radially outwardmost web portion 120A, 122A, respectively, and forms open through channel 166, 168 extending parallel relative to wall 118B or 118C. Each channel 166, 168 from a given disc member is sized and shaped to be loosely engaged by a corresponding end portion 130 or 132 of link member 114, whereby a permanent hinge mount is formed there-between.

Figure 4:
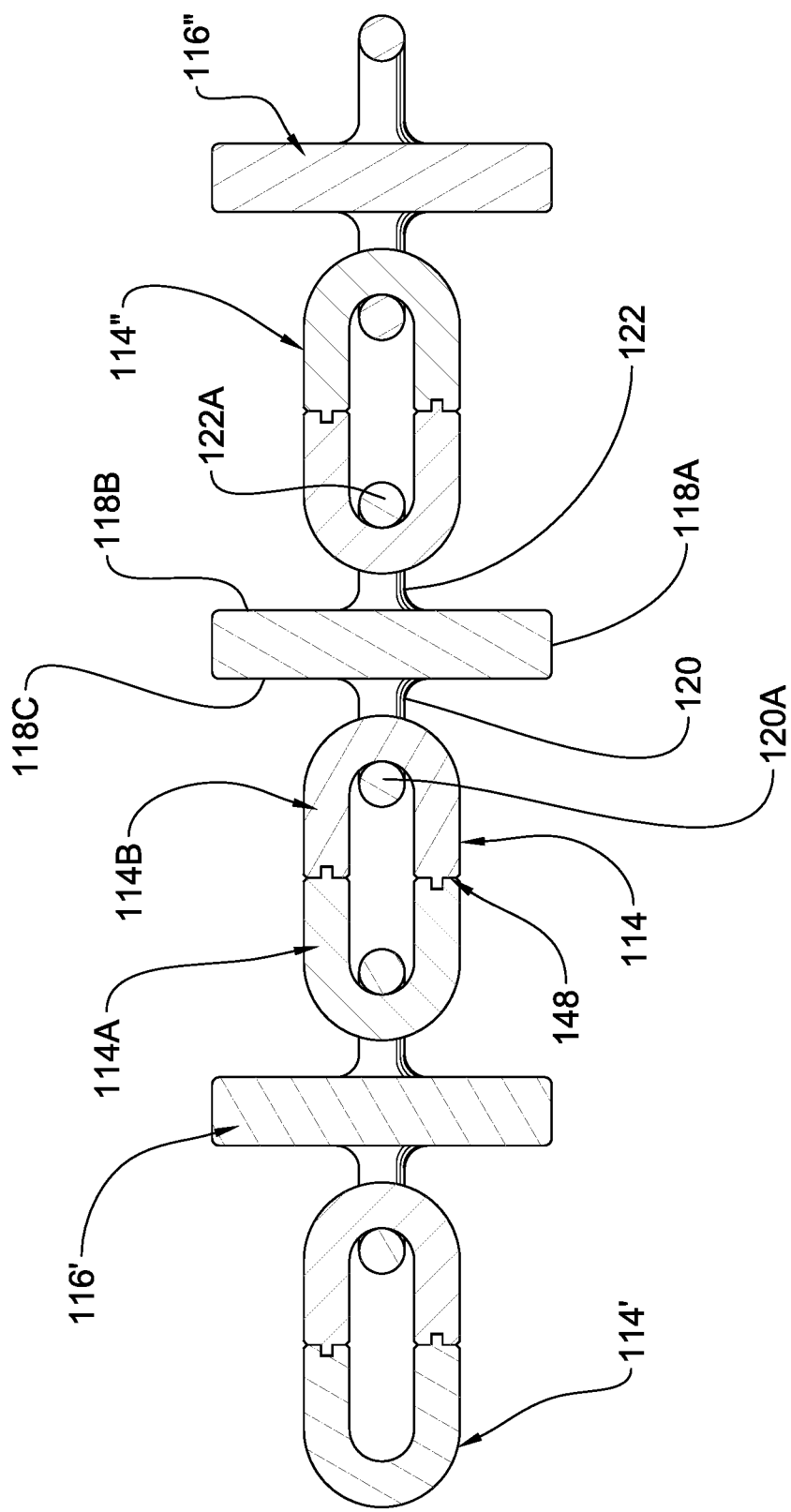
FIG. 4 is a longitudinal sectional view taken along line 4-4 of FIG. 3.
Figure 5:
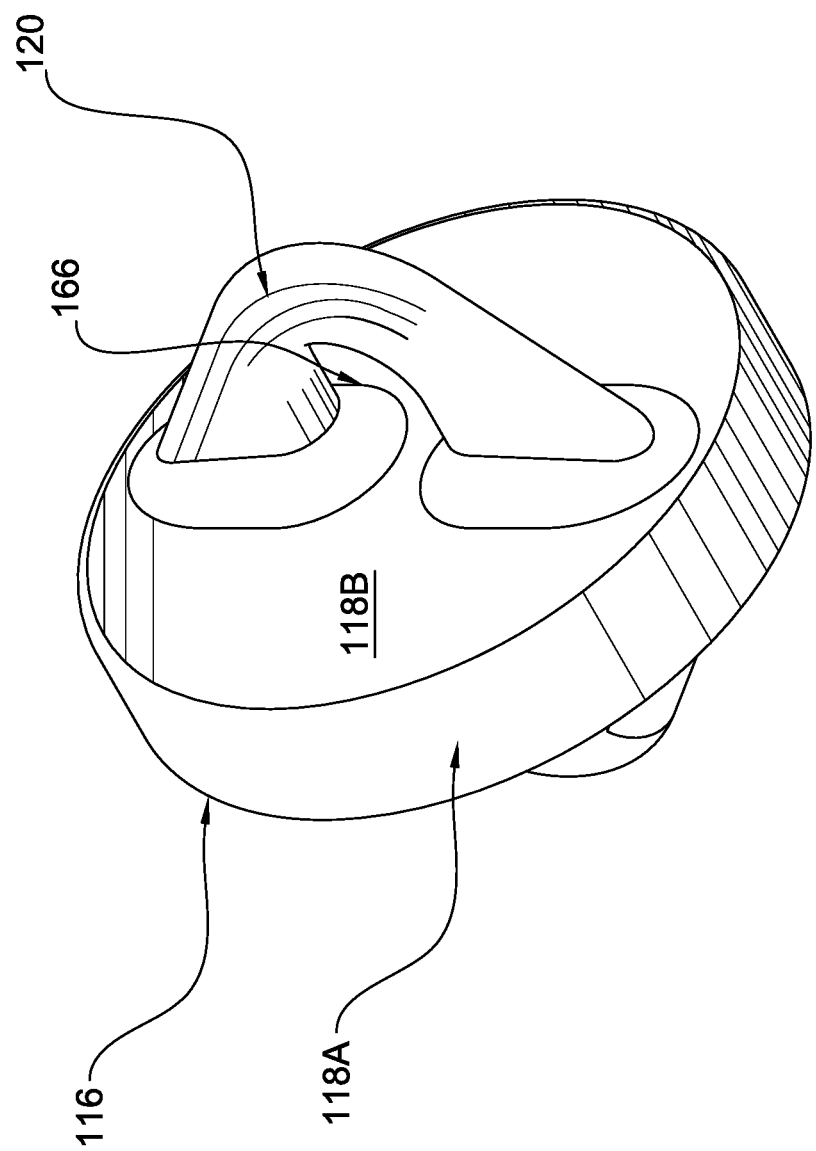
FIG. 5 is an enlarged perspective view of a single double ear disc from FIG. 1 taken in isolation.
Figure 7:
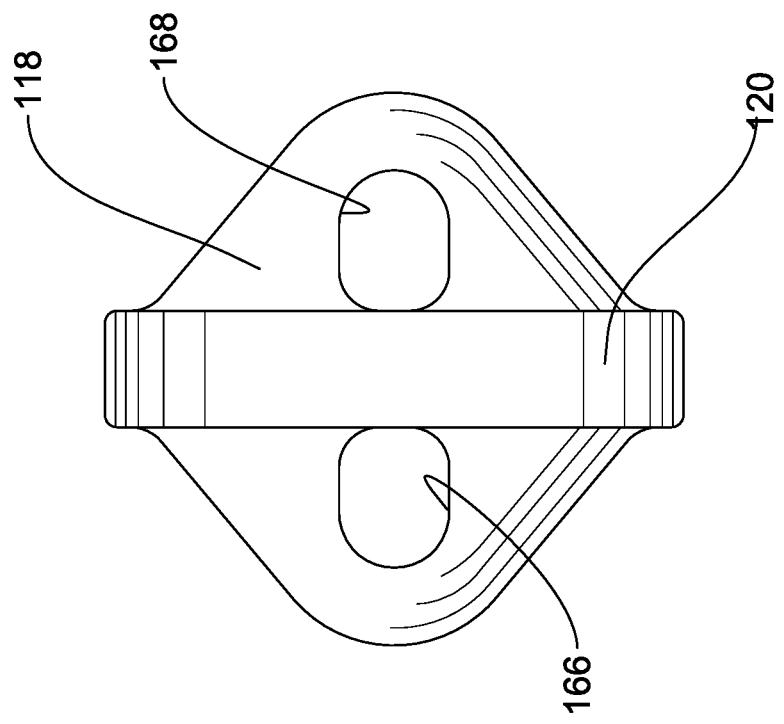
FIG. 7 is a plan view of the disc of FIG. 5 at the scale of FIG. 6.
Figure 6:
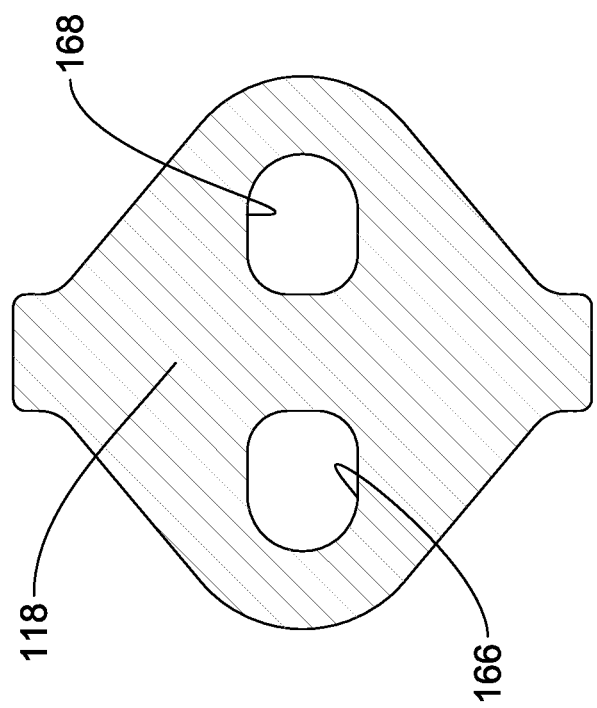
FIG. 6 is a cross-sectional view at a smaller scale of the disc of FIG. 5.
Figure 8:
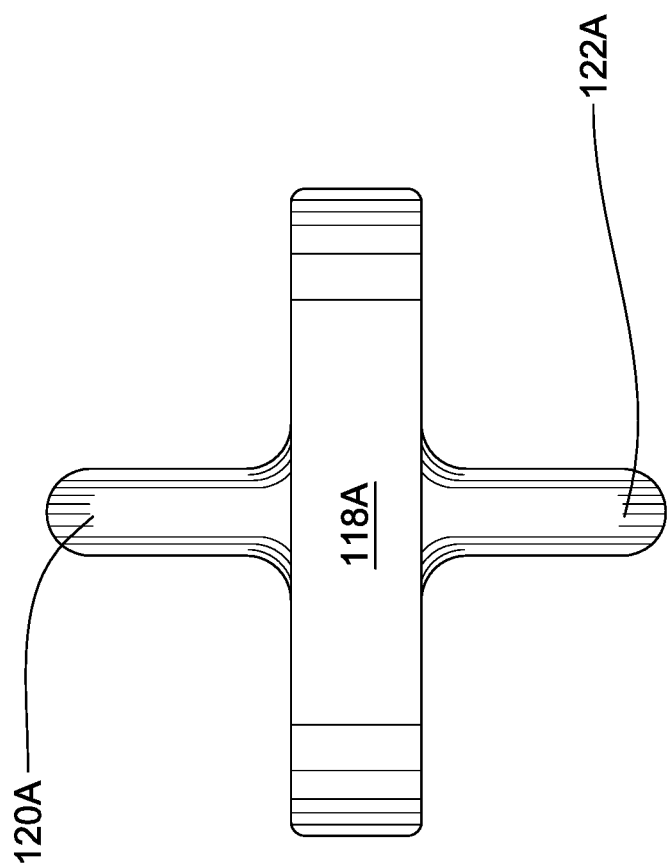
FIG. 8 is a peripheral edge view of the disc of FIG. 5 at the scale of FIG. 6.

In one embodiment and as best shown in FIG. 4, each ear member 120, 122, is cross-sectionally circular at least at its radially outwardmost web portion 120A, 122A that is located furthest away from corresponding disk 116.

In one embodiment, each disc member 116 is wholly made from an engineering thermoplastic material which can be easily machined, providing dimensional stability, low coefficient of friction combined with high abrasion wear resistance, all with consistent properties in wet or moist environment. In one embodiment, the material of disc member 116, including ear members 120, 122, is selected from the group comprising:

a) a polyethylene plastic, such as UHMW-PE as made under the trademark Polystone (registered trademark) from the United States corporation Rockling Engineering plastics ("Rockling"):
b) a cast nylon, such as Nylon 6™ from Rockling;
c) an extruded nylon, such as Nylon 66™ from Rockling;
d) a copolymer acetal.

The shape of each disc member open ear member 120, 122, may be for example ovoidal, arcuate, circular, quadrangular, or other suitable shapes, provided a transverse through channel 166, 168, is formed. In one embodiment, the disc member main plate 118 is circular in shape, however other shapes such as quadrangular are not excluded from the scope of the invention.

In one embodiment, the link members 114 are wholly made from stainless steel, or other suitable rigid metallic material.

In one embodiment, each arcuate ear member 120, 120, defines a smooth arcuate outer wall surface of a shape complementary to that of the smooth arcuate inner wall surface of the correspondingly engaged outer arcuate end portion 130, 132, of link member 114, so that a smooth, continuous hinge means assembly be formed therebetween.

In the second embodiment of the invention illustrated in FIGS. 15 to 28 of the drawings, the linked disk assembly 212 comprises a series of (e.g. metallic) link members 214, 214', 214", etc . . . connected to each other coextensively and indirectly via a series of successively alternating corresponding double ear disc members 216, 216', etc . . . so that an elongated discontinuous chain links assembly 212 is formed. With this discontinuous chain link assembly, the consecutive links have no metal to metal contact parts and thus do not rub each other in successive pairs so that abrasive metal dust formation is avoided, thereby protecting against contamination the food granular particles conveyed by the link disc assembly.

As best shown in FIGS. 24 to 28, each link member 214 is of the open chain link type, having a single rigid unitary body 230 (e.g. from metallic plastic material) defining two opposite arcuate (e.g. C-shape) end portions 232, 234, integrally interconnected at one end by a straight web leg 236. The end walls 232A, 234A, of link member end portions 232, 234, respectively opposite web leg 236 are spaced from one another, thus defining a gap G therebetween. Gap G enables access to link member ovoidal inner volume or enclosure E.

In one embodiment, each end wall 232A, 234A, is flat, so that gap G forms a quadrangular through-channel.

As best illustrated in FIGS. 19 to 23, each disc member 216 comprises a disc plate 218 defining a peripheral tangential flat edge 218A and two opposite flat walls 218B, 218C merging with the peripheral edge 218A. Each disc member 216 is moulded or machined out of UHMW-PE other suitable rigid (e.g. plastic) material. Each ear member 220, 222, transversely projects from main walls 218B, 218C, respectively. In one embodiment, each ear member 220, 222, includes a radially outermost portion 220A, 222A, and forms a open through channel 226, 228, respectively, parallel to transverse discoid walls 218,B, 218C. Web portions 220a, 222A each define a tangentially flat radially outward edge 221, 225, and an arcuate radially inward edge 223, 227, respectively.

Each channel 226, 228, from a given disc member 216 is releasably engaged by a selected C-shape end portion 232 or 234 of a given open link member 214, whereby a hinge mount is formed therebetween.

Figure 27:
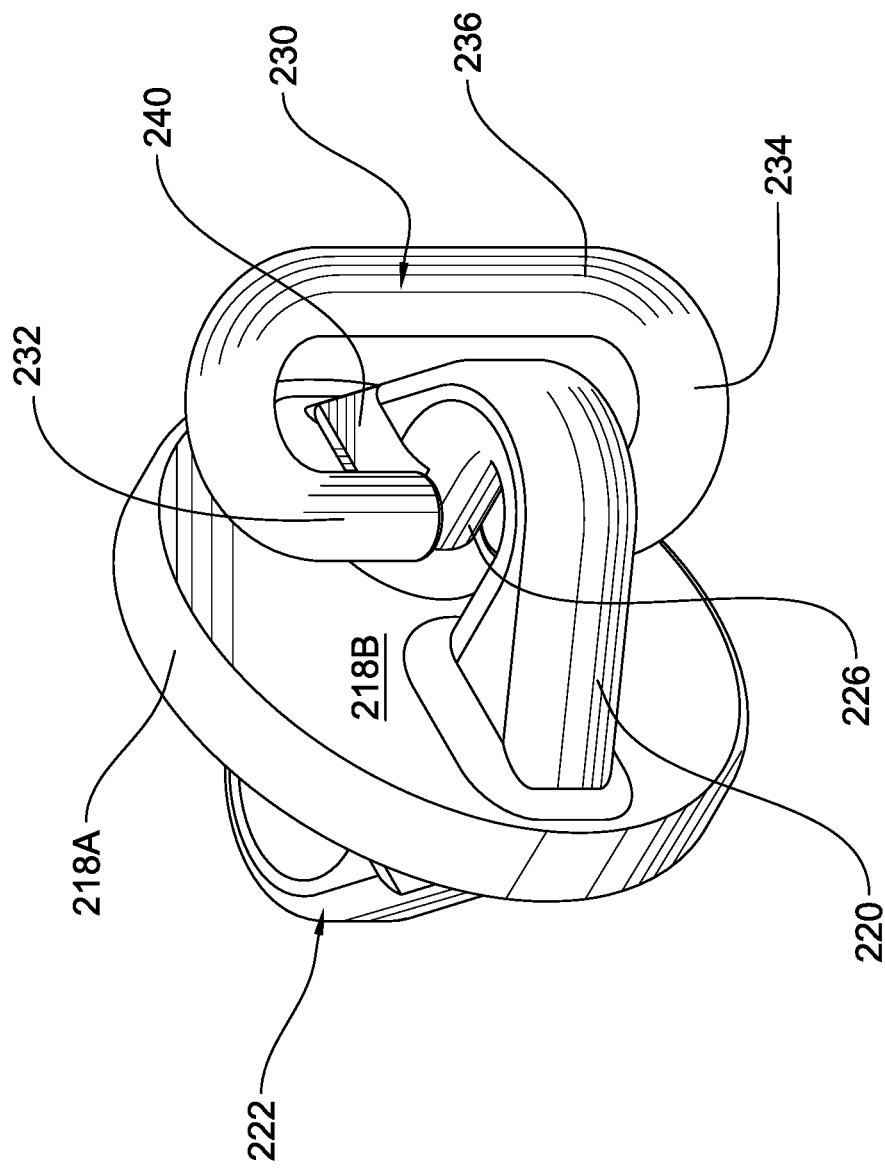
FIGS. 27 and 28 are perspective views of the disk similar to FIG. 19, and further sequentially suggesting how a second embodiment unitary link member is disengaged therefrom.
Figure 28:
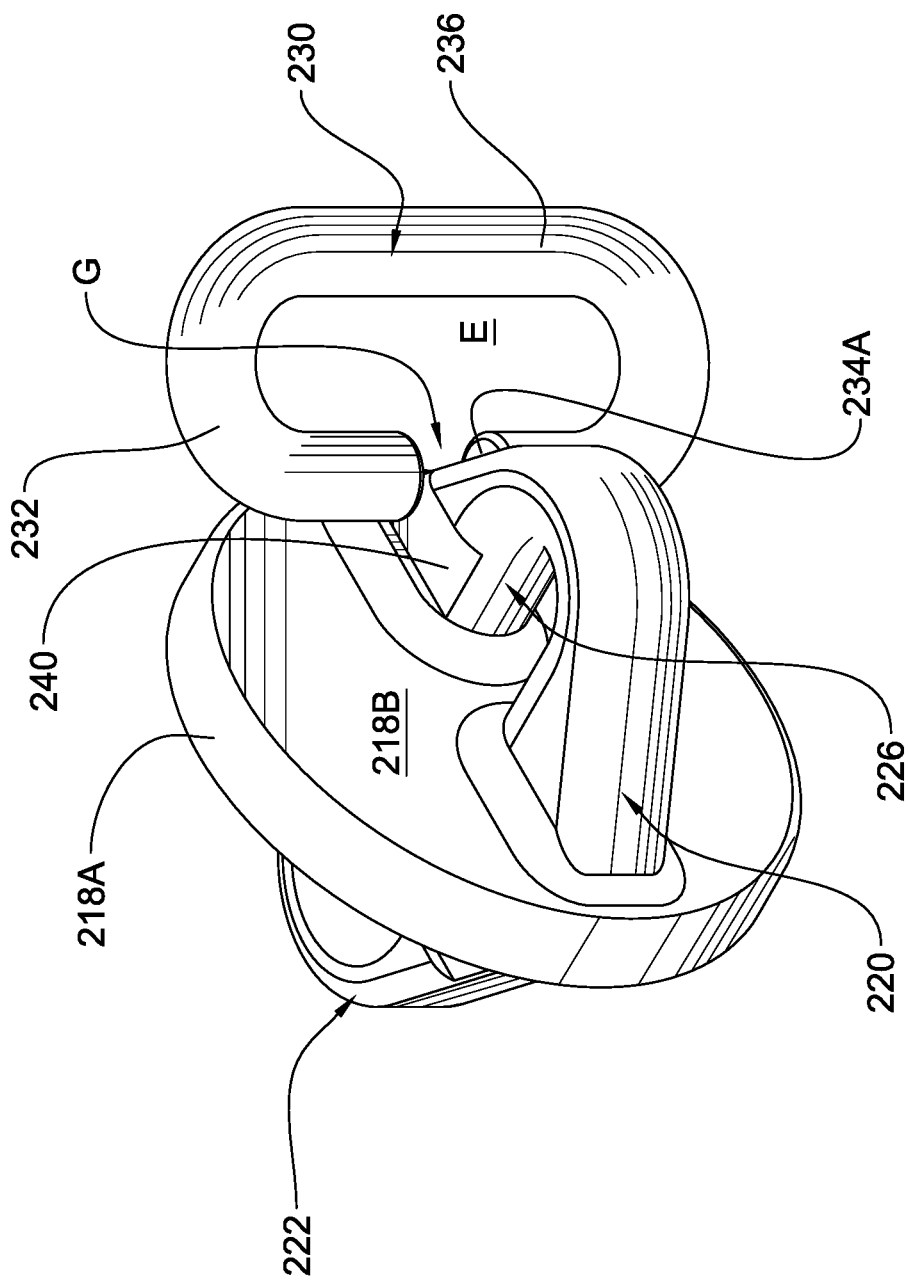

More particularly and as suggested in FIGS. 27 and 28, ear members 220 and 222 engage transversely through the gap G of their corresponding link member 214 so that ear members 220 and 222 tangentially penetrate inside link member enclosure E. Thereafter, link member C-shape end portion 232 /234 slide transversely through the plane of corresponding ear members 220 and 222 and sink into channel 226 or 228, wherein link member 214 and disc 216 become releasably hingedly interlocked.

In the second embodiment of the invention disclosed in FIGS. 15 to 28 of the drawings, there is provided a sanitary method of conveying dairy as well as meat and poultry products within the present applicant's tubular chain conveyor. The present chain and disc assembly consists of successively alternating open arcuate-shape (e.g. 316L stainless steel material) chain links 214, as well as e.g. UHMW-PE conveying discs 216. In this latter embodiment, the present assembly forming the total length is an important mechanical component of the tubular chain conveyor as it is the main subsystem that conveys the bulk material into the buckets P between each pair of successive discs 216, 216', to another location. Product is thus fed into an open pocket P (FIG. 18) formed between two adjacent disks 216, 216', and is dragged along the inside of a conveyor pipe via a drive sprocket (not shown).

In this second embodiment, the chain and link assembly 212 has a consistent pitch, for example of 118 mm. The open link members 214 enable the user to quickly disconnect a segment along the entire chain link assembly length, by sliding ear 220 or 222 from link member enclosure E through link member gap G and outwardly therefrom. This quick disconnect design completely eliminates in an innovative and unexpected fashion the need for hardware assembly methods, and therefore worn linked disk assembly components can be substituted with greater ease. The geometry and features of the chain link 214 and disks 216 also facilitate washability through the integrated wet wash down system of the tubular chain conveyor, for quick turn around.

Figure 18:
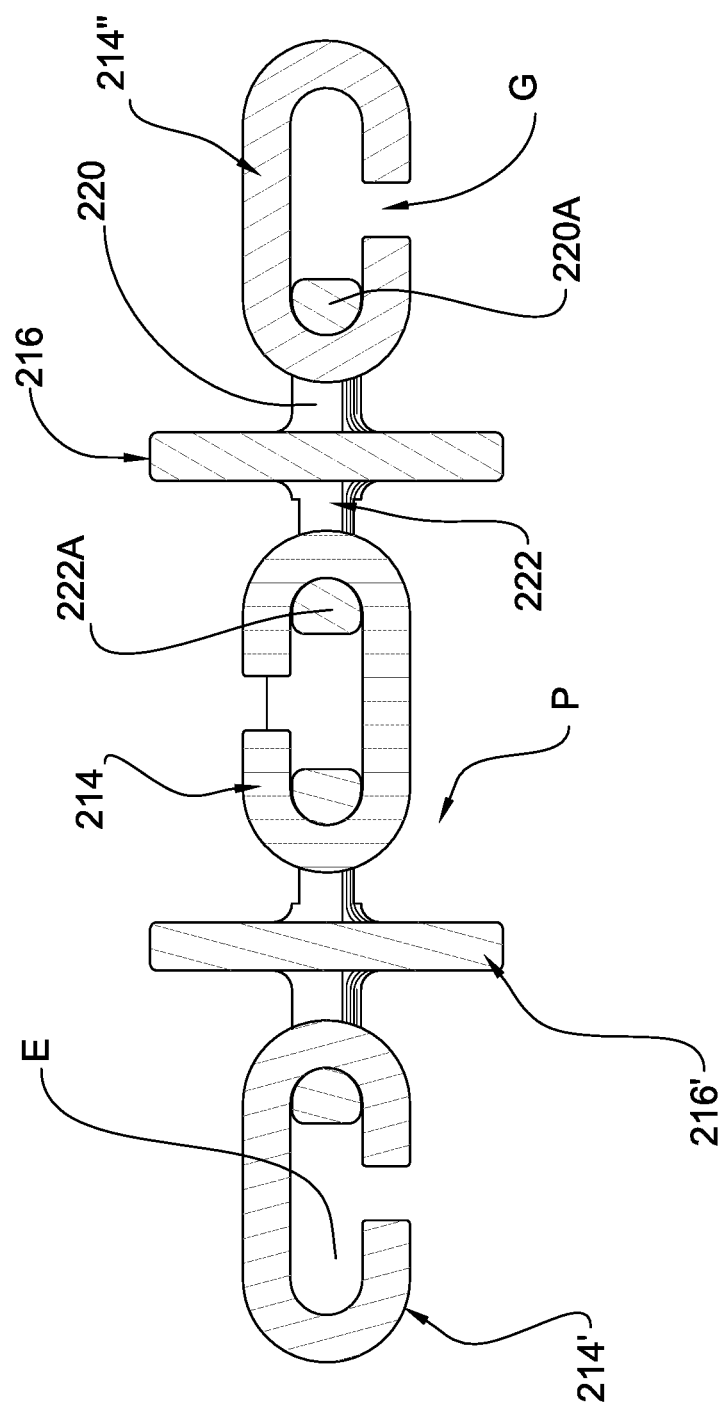
FIG. 18 is a longitudinal sectional view taken along line 18-18 of FIG. 17, showing the second embodiment of linked disk assembly, wherein an assembly layout of chain and disks is formed with the alternate mode of opening on the chain link in accordance with the second embodiment of the invention.
Figure 19:
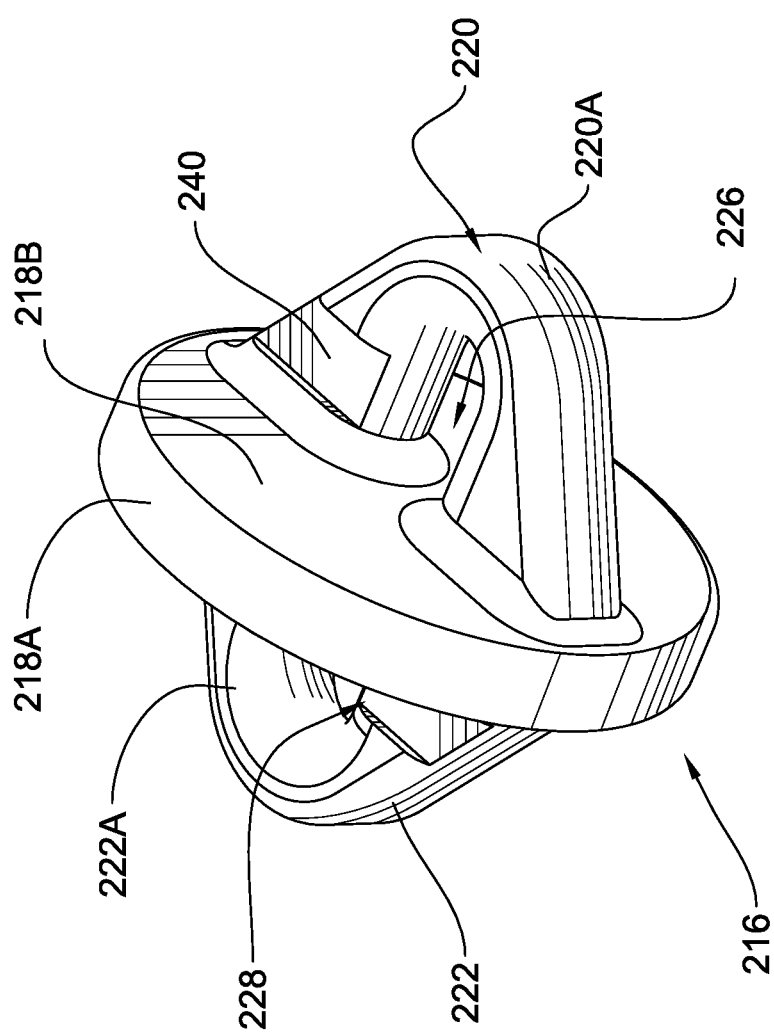
FIG. 19 is a perspective view of a single double ear disk member from FIG. 15, taken in isolation, and also showing increased thickness of the disc ear relative to that of the first embodiment of FIG. 5, and further showing transverse notches on the radially inner portion of the disc ear adjacent the disc main body, for chain link quick release feature.
Figure 23:
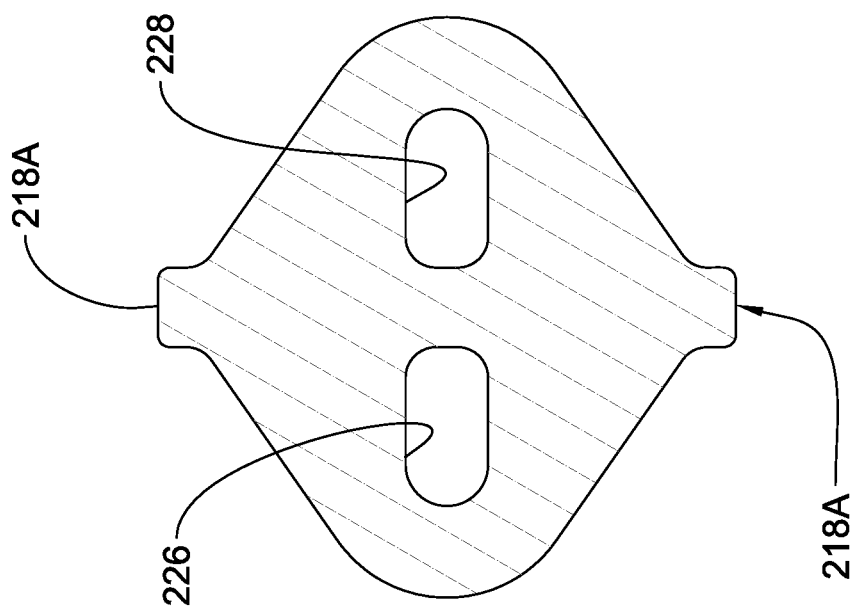
FIG. 23 is a cross-sectional view of the disk taken from FIG. 15 along line 23-23 of FIG. 22.
Figure 22:
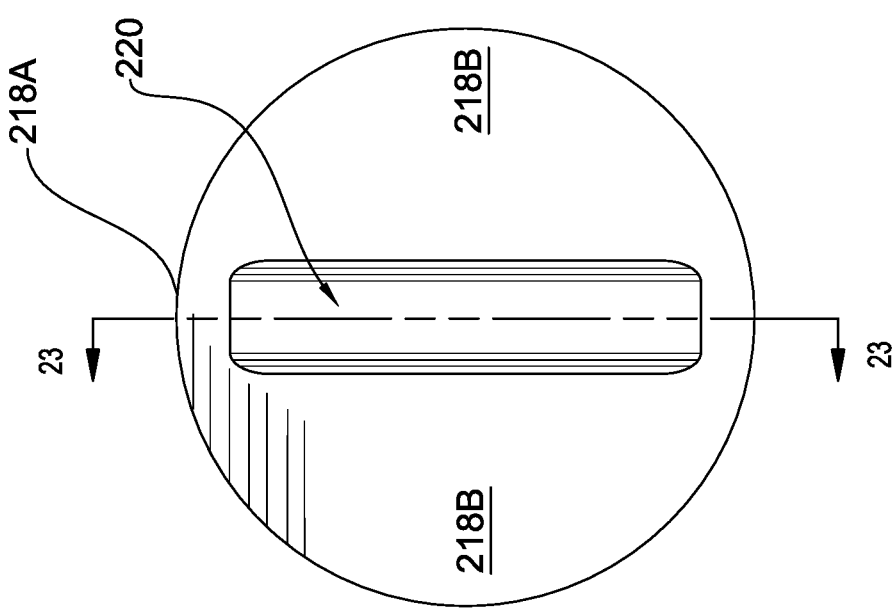
FIG. 22 is an end view of the disk assembly of FIG. 15.
Figure 25:
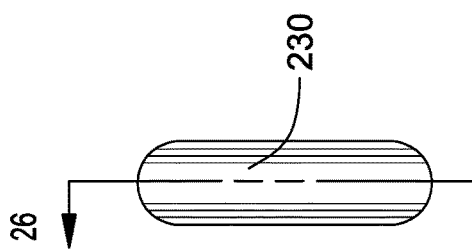
FIGS. 24 and 25 are plan and edge views respectively of the second embodiment of unitary arcuate rigid (e.g. metallic) chain link.
Figure 24:
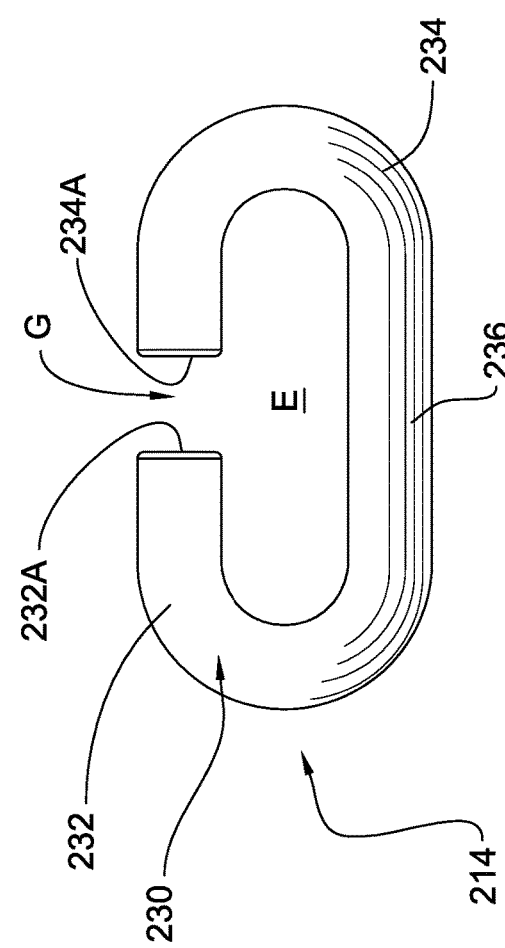
Figure 26:
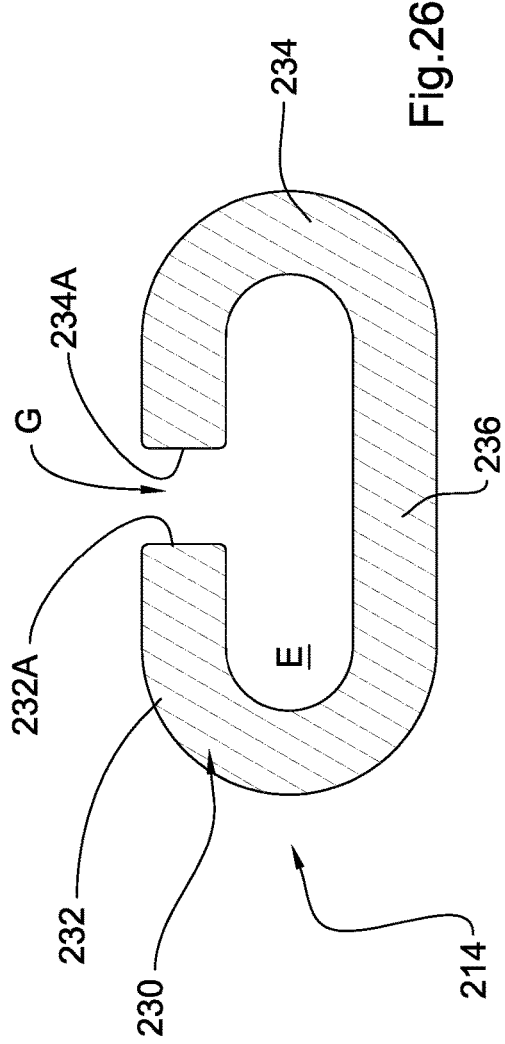
FIG. 26 is a sectional view of the chain link from FIG. 24, taken along line 26-26 of FIG. 25.

In the second embodiment of the invention, in order to retain stiffness and reduce elongation, the disc 216 may be moulded from UHMW-PE and may feature thicker disk link ears 220, 222, compared to the first embodiment of the invention. In one embodiment, the thickness of ears 220, 222 from the second embodiment of link and disc assembly measures 18.5 mm, while that of ears 120, 122 from the first embodiment of link and disc assembly measures 12.7 mm. This enlarged cross-sectional size of ears 220, 222, is shown e.g. in FIG. 18 at the ear member radially outwardmost web portion 220A, 222A, located furthermost away from disc 216. In this second embodiment of the invention, the ear web portion 220A, 222A is semi-circular in cross-section, defining radially inward arcuate edge 223, 227 and a straight tangential radially outwardmost edge 221, 225, opposite the arcuate edge thereof as best illustrated in FIGS. 18 and 21. Such increase is limited to the interior width of the 316L stainless steel chain link 214 and the washability criteria at the bearing surfaces required under USDA regulations. Therefore, further increase to the thickness of ears 220, 222, would inhibit the link's dynamics and its ability to swivel on all axis other than the axis along the conveyed direction during operating conditions. As a result, increasing the thickness of disc ears 220, 22, as well as reducing the width of link member access gap G will provide a larger bearing surface as well as a larger cross-sectional area to retain stiffness. The disc will also feature flat circumferential walls 218B, 218C facing the opposite ears 220, 222, respectively, for load bearing and for better stress distribution imposed by the sprocket tooth engagement.

In one embodiment, and as best shown in FIG. 21, the merging edge zones of ear member radially outermost edge portion 221 or 225 with the coextensive arcuate edge portions 223 or 27 thereof, at 221A, 221B and 225A, 225B, respectively are rounded for optimal transverse slidethrough engagement of ear member 220 through link member gap G.

In one embodiment, there is added a notch 240 transversely to a portion of each ear 220, 222, adjacent a corresponding disc 216. Notch may have e.g. 2 mm in depth. This notch 240 constitutes a slide ramp for facilitating ingress/egress of a selected link member 214 from ear channel 228 or 226, and will act to reduce the number of ways the chain link 214 can disconnect from the disk 216 to avoid accidental release hazards. The notch 240 does not increase stress levels nor compromises integrity and stiffness of the disc 216.

Notch 240 provides unexpectedly advantageous linked disc assembly performance in that the placement of the notch 240 transversely of ears 220, 222, ensures that the disconnection can occur solely through manual manipulation and cannot accidentally occur while the disk and chain assembly 212 extends inside the tubular conveyor. The conveying direction as well as the volume available in the conveyor tube restricts such motion for disconnection. It would require the operator to bring the conveyor to a complete stop and release the chain tension to perform a manual disconnection of the link 214.

In one embodiment of chain link assembly 210 according to the present invention, the diameter of link member gap G is complementarily sized to the width of notch 240, for free yet frictionally forcible passage of link member 214 transversely across ear 220 or 222 along sliding ramp notch 240, wherein accidental disconnection between link 214 and disc 216 is largely avoided. In essence, the main purpose of the complementary sized chain link gap G and of disc ear notch 240 is to enable secure manual quick release feature.

In addition to stopping the conveyor, the disc and link assembly 210 will require the user to perform three disconnect manoeuvering steps:
 a. the user manipulates the length of the chain link 214 to become perpendicular to the conveying direction and thus aligning the chain link 214 opening to the disk notch 240;
 b. there is translational movement along the length of the notch 240; and
 c. there is sliding motion of the chain link 214 to disconnect itself from the rest of the disk 216.

The disc 216 and chain link 214 are assembled in such a way that the link member gap G is successively alternating along the total length of the chain and disk assembly 210. This positional shifting of link gap G will allow the present chain 210 to maintain balance throughout the lengthwise axis of conveyed direction, which can further prevent undesirable chain twisting which can result in unwanted chain jumping when attempting to engage with the sprocket.

During bulk conveying while the chain 210 is turning around both sprockets, there is no metal to metal contact making the equipment suitable for food applications, since no metallic components engage with one another thus minimizing risk of frictional production of minute metallic particles which would constitute a contamination health hazard if accidentally falling into and mixing with food product conveyed by the conveyor. This equipment is also suitable for other applications, for example conveying oil sands, since otherwise accidental sparks from frictional inter-engagement of metallic parts could lead to explosions and fire from volatile gaseous compounds from the oil sands, a safety concern. Other suitable applications would include conveying e.g. milk, slurry and other gaseous components.

I claim:

1. A linked disc assembly for use in continuous chain tensioning assemblies in tubular chain drag conveyors with no metal to metal contact points in the conveying area with wet Clean In Place features, said linked disc assembly comprising a series of first link members connected to each other coextensively and indirectly via a series of alternating double ear first disc members, so that an elongated linked disc assembly be formed; each disc member comprises a disc plate defining a peripheral edge and two opposite main walls merging with said peripheral edge, an ear member transversely projecting from each of the two said main walls respectively; each ear member consisting of an arcuate leg circumscribing an open through channel extending parallel to said disc plate, each said through channel from a given disc member is loosely engaged by a corresponding link member, whereby a hinge mount is formed therebetween;

wherein each link member is of the open chain link type defining a single unitary body having two opposite arcuate portions joined at one end thereof and spaced at their opposite spaced end portions thereof by a spacing gap for access to an enclosure circumscribed said link member body;

and further including a ramp means providing manual guided quick release through passage of a link member transversely through said ear member arcuate leg while largely avoiding accidental release thereof.

2. A linked disc assembly as in claim 1, wherein said ramp means consists of a transverse notch made onto said ear member arcuate leg adjacent a corresponding said disc plate, said notch sized and shaped complementarily to said link member spacing gap wherein a selected one of said link member spaced opposite end portions are slidingly engageable through said notch during egress/ingress thereof.

3. A linked disc assembly as in claim 2, wherein said ear member arcuate leg includes a radially outward web portion farthest away from said disc plate, said web portion defining a generally semi-circular cross-section.

4. A linked disc assembly as in claim 3, wherein said ear member web portion includes a radially outermost flat tangential first edge portion and a radially inward arcuate second edge portion whereby said web portion is sized to conformingly fit inside said link member enclosure.

5. A linked disc assembly as in claim 2, further including second disc members, said second disc members similar to the first mentioned ones but lacking said notches; and further including second link members, each second link member consisting of one and another separate arcuate elements, each said one arcuate element defining first tenon and mortise means at opposite ends thereof and each said another arcuate element defining second tenon and mortise means at opposite ends thereof wherein a tenon and mortise joint means is formed by interlocking engagement of said first and second tenon and mortise means, and wherein said arcuate elements tenon and mortise means further including a radially outward chamfer zone for accommodating a welding material.

6. A linked disc assembly as in claim 5, wherein link member said chamfer zone is cross-sectionally V-shape.

7. A linked disc assembly as in claim 6, further including welding material inserted into said chamfer zone, said welding material selected from the group comprising TIG, MIG and ERW.

8. A linked disc assembly as in claim 7, wherein welding material particle coarseness from link member grinding and polishing ranges between 53 to 140 micrometers.

9. A linked disc assembly as in claim 4, wherein said first and second edge portions merge at corner edge portions, said corner edge portions being rounded to facilitate through passage of said ear members across said link member spacing gap.

10. A linked disc assembly as in claim 1, wherein the shape of said disc plate is selected from the group comprising ovoidal, arcuate, circular and quadrangular shapes.

11. A linked disc assembly as in claim 1, wherein the material for said disc plate is selected from the group comprising UHMW-PE, cast nylon, extruded nylon, and copolymer acetal.

* * * * *